(12) United States Patent
Ehlers et al.

(10) Patent No.: US 11,261,843 B2
(45) Date of Patent: Mar. 1, 2022

(54) METHOD FOR LOAD REDUCTION ON WIND TURBINE BLADE PITCH BEARINGS

(71) Applicant: SIEMENS GAMESA RENEWABLE ENERGY A/S, Brande (DK)

(72) Inventors: Julian Ehlers, Brackendale (CA); Michael Hind, Longmont, CO (US); Drew Eisenberg, Boulder, CO (US); Alejandro Gomez Gonzalez, Aarhus (DK); Peder Bay Enevoldsen, Vejle (DK); Lasse Gilling, Vejle (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 183 days.

(21) Appl. No.: 16/487,315

(22) PCT Filed: Nov. 27, 2017

(86) PCT No.: PCT/EP2017/080438
§ 371 (c)(1),
(2) Date: Aug. 20, 2019

(87) PCT Pub. No.: WO2018/153518
PCT Pub. Date: Aug. 30, 2018

(65) Prior Publication Data
US 2020/0056586 A1 Feb. 20, 2020

(30) Foreign Application Priority Data
Feb. 22, 2017 (DE) .................... 10 2017 202 886.6

(51) Int. Cl.
*F03D 7/02* (2006.01)
*F03D 80/70* (2016.01)

(52) U.S. Cl.
CPC .......... *F03D 7/0224* (2013.01); *F03D 7/024* (2013.01); *F03D 80/70* (2016.05)

(58) Field of Classification Search
CPC .... F03D 7/024; F03D 7/0292; F05B 2260/79; F05B 2270/309; F05B 2270/326; F05B 2270/331
See application file for complete search history.

(56) References Cited

U.S. PATENT DOCUMENTS

2010/0196156 A1* 8/2010 Svendsen .............. F03D 7/0224
416/1
2011/0305568 A1 12/2011 Brath et al.
(Continued)

FOREIGN PATENT DOCUMENTS

CN 102926930 A 2/2013
CN 103742357 A 4/2014
(Continued)

OTHER PUBLICATIONS

Office Action in corresponding Chinese Patent Application No. 201780089923.0 dated Jun. 1, 2020. 8 pages.
(Continued)

*Primary Examiner* — Courtney D Heinle
*Assistant Examiner* — Danielle M. Christensen
(74) *Attorney, Agent, or Firm* — Schmeiser, Olsen & Watts, LLP (57) ABSTRACT

Provided is a method for adjusting a pitch angle of a rotor blade connected to a rotor of a wind turbine, the method includes: pitching the rotor blade towards a target blade pitch angle, the manner of pitching depending on a load on a pitch bearing and/or an azimuthal position of the rotor.

15 Claims, 8 Drawing Sheets

(56) References Cited

U.S. PATENT DOCUMENTS

| | | | |
|---|---|---|---|
| 2014/0003939 A1 | | 1/2014 | Adams et al. |
| 2014/0154075 A1 | * | 6/2014 | Kristoffersen ........ F03D 7/0224 416/1 |
| 2016/0258416 A1 | | 9/2016 | Hammerum |
| 2017/0096984 A1 | * | 4/2017 | Kacmarcik ........... F16C 19/522 |

FOREIGN PATENT DOCUMENTS

| | | |
|---|---|---|
| CN | 105683563 A | 6/2016 |
| DE | 102010035055 A1 | 2/2012 |
| EP | 1788237 A2 | 5/2007 |
| WO | WO-2015003710 A1 * | 1/2015 ........... F03D 7/0264 |

OTHER PUBLICATIONS

International Search Report for application No. PCT/EP2017/080438 dated Mar. 21, 2018.

Trudnowski D et al: "Independent pitch control using rotor position feedback for wind-shear and gravity fatigue reduction in a wind turbine", Proceedings of the 2002 American Control Conference. ACC. Anchorage, AL, May 8-10, 2002; [American Control Conference], New York, NY : IEEE, US, vol. 6, May 8, 2002 (May 8, 2002), pp. 4335-4340, XP010597604, ISBN: 978-0-7803-7298-6 * the whole document.

* cited by examiner

METHOD FOR LOAD REDUCTION ON WIND TURBINE BLADE PITCH BEARINGS

CROSS-REFERENCE TO RELATED APPLICATIONS

This application claims priority to PCT Application No. PCT/EP2017/080438, having a filing date of Nov. 27, 2017, which is based on German Application No. 10 2017 202 886.6, having a filing date of Feb. 22, 2017, the entire contents both of which are hereby incorporated by reference.

FIELD OF TECHNOLOGY

The following relates to a method and arrangement for adjusting a pitch angle of a rotor blade of a wind turbine and further relates to a wind turbine comprising the arrangement.

BACKGROUND

A wind turbine comprises a rotor at which plural rotor blades are connected and which drive a generator to generate electric energy. The rotor blades may be adjusted with respect to their orientation relative to the wind wherein the rotor blades may be rotated around a longitudinal axis of the rotor blades which is commonly referred to as pitching the rotor blade. Modern wind turbines may be designed for pitch regulation using either pneumatic, hydraulic or electric pitch systems. Thereby, conventionally, a pitch system may consist of an actuator which may transform a signal coming from the controller into a motion signal for the pitch motor/pitch actuator which in turn rotates the blade around its pitch axis (i.e. the longitudinal axis of the rotor blade).

The blade and the pitch system may be coupled through a pitch bearing. During operation, the pitch bearing may be subjected to high bending loads due to the bending of the blades into the wind. The highest blade thrust may occur at the wind speeds just before rated power is reached and just after rated power is reached. At this time of high loading there is also significant pitch motion to limit those loads and also for power regulation.

The bending of the rotor blade may cause elastic deformation internally in the pitch bearing which in turn may cause high wall pressure between the balls of the bearing itself and the runway (a notch along which the bearing balls or cylinders may roll). When the pitch system is actuated, these high contact pressures inside the bearing may lead to fatigue damage. This eventually may lead to component damage. Particularly hazardous may be the combination of pitch activity and very high bending loads which although are seldom (in terms of relative occurrence) may lead to so-called low cycle fatigue. Blade bearing fatigue may be the product of the bending moment on the blade taken to an exponential power and the blade pitch movement. Blade bearing fatigue may depend non-linearly on the load, specifically it might be proportional to load elevated to the power of 3 multiplied by the pitch movement. Blade pitch bearing may be a limiting factor in the design of larger wind turbines.

Several methods have been applied, to reduce the contact pressure in the raceway or runway of the pitch bearing: Conventionally, the loading on the turbine can be reduced. This may be done by what is sometimes called "peak shaving". Peak shaving may be a change which is introduced into the controller behaviour such that the blades pitch earlier into the wind, in this way reducing the loading on the whole rotor. The drawback of this methodology is that it may also affect the power performance and thus reduces the energy production.

Another methodology to reduce bearing load may be to increase the size of the bearing. Increasing the diameter of the bearing may reduce the local induced stresses in the material. Nevertheless, this solution may not be very practical, once the hub and the blades have been designed. A larger pitch bearing may also be more expensive, increasing the cost of the generated energy.

Further methods which have conventionally been used may include for example partial pitch, wherein the pitch system is moved outwards along the blades while retaining a fixed pitch section inboards, or cyclic pitch, which reduces extreme loads, but increase pitch activity. This may be a complicated interaction. Also further outboard, the bearing would need to be smaller and have a lower fatigue limit.

Document US 2011/0305568 A1 discloses a wind turbine control system suitable for minimizing actuation of pitch actuators, wherein an error gain schedule in full load control is used for reducing pitch actuation when the difference between the rotor speed and the reference rotor speed is not critical for the load of the wind turbine components. The use of the error gain schedule may reduce wear of the pitch actuators and may improve reduction of structural oscillations, since focus is removed from tracking the rotor speed reference when the speed error is low.

It has however been observed, that conventional methods and arrangements are not in all situations and under all circumstances capable of reliably and effectively reducing pitch bearing load or pitch bearing damage, while at the same time other components are not negatively affected or the wind turbine performance is not negatively affected.

Thus, there may be a need for a method and arrangement for adjusting a pitch angle of a rotor blade, wherein a load on the pitch bearing is reduced, while at the same time other components are not negatively affected and the performance of the wind turbine is not negatively affected.

SUMMARY

According to an embodiment of the present invention it is provided a method for adjusting a pitch angle of a rotor blade connected to a rotor of a wind turbine, the method comprising pitching the rotor blade towards a target blade pitch angle, the (in particular way of, or manner of, or characteristic, or speed of) pitching depending on a (e.g. measured, or simulated, or estimated, or theoretically calculated) load on a pitch bearing, in particular depending on an azimuthal position of the rotor.

According to an embodiment of the present invention it is provided a method (or arrangement) for adjusting a pitch angle of a rotor blade connected to a rotor of a wind turbine, the method comprising pitching the rotor blade towards a target blade pitch angle, the (in particular way of or manner of or characteristic or speed of) pitching depending on an azimuthal position of the rotor. Thereby is may not be necessary to determine a load on the bearing.

The load on the pitch bearing may vary or correlate with the azimuthal position of the rotor. The load on the pitch bearing may further vary or correlate with factors (like motion direction of rotor blade, external conditions etc.) other than the azimuthal position of the rotor. These additional input sources could include but not limited to wind speed measurements, tower strain and torsion, power measurement, pitch actuator strain, blade vibration, tip deflection sensor, Lidar ("laser illuminated detection and ranging") measurements, shear measurements, or any other measurement that can be correlated to pitch bearing load.

The method may be performed by a controller and/or a pitch adjustment system of a wind turbine. The method may be applied independently and separately for each of plural rotor blades connected to the rotor. Thus, the different rotor blades may be pitched independent from each other and in particular in a different manner. Thereby, a target pitch angle of all rotor blades may be the same but the manner or the way in which the different rotor blades are pitched towards the target pitch angle may be different. The manner whether to pitch or how to pitch (with what pitch speed) the rotor blades may depend on the azimuthal position of the rotor, thus also on the azimuthal position of the respective rotor blade or the orientation of the rotor blade.

For each of the plural rotor blades, the azimuthal position of the rotor may be defined for example relative to a vertical position of the respective rotor blade in which the top of the rotor blade points upwards. Depending on the azimuthal position of the rotor, pitching may be enabled, disabled or performed with a particular pitch rotational speed which may vary for different azimuthal positions. In particular, when the rotor blade is oriented in an azimuthal range which is subjected to relatively high loads, the pitching may either be disabled in this region or the pitching speed may be reduced relative to other azimuthal positions. Further factors may govern the manner how the pitching is performed. For example, environmental factors, such as wind speed, wind turbulence and/or an actual measured or estimated load on the rotor blade and/or on the pitch bearing may be taken into account to affect the manner in which the pitching is performed.

The target blade pitch angle may be the blade pitch angle optimal for the actual rotational speed of the rotor and optimal for the present wind speed and wind direction, in order to extract maximum electric energy from the wind. During a full revolution of the rotor blade, the manner in which the rotor blade is pitched may depend on the azimuthal position. The pitch bearing damage may be calculated or estimated e.g. as the product between the pitch travel and the bearing moment elevated to a given power exponent. In particular, when the bearing moment is relatively high, the pitch travel may be reduced, in order to reduce the pitch bearing damage. The pitch travel may for example be reduced by disabling to pitch the rotor blade in a range where the bearing moment is relatively high or in particular higher than a threshold or by reducing the pitch rotational speed in this region.

In particular, pitching the rotor blade may be performed such that the pitch bearing damage is substantially equal for a whole revolution of the rotor blade. Other schemes are possible. Thereby, the pitch bearing damage may be effectively reduced, while ensuring high wind turbine performance and without damaging other components of the wind turbine.

According to an embodiment of the present invention, pitching of the rotor blade comprises disabling pitching the rotor blade in a range of azimuthal positions of the rotor, in particular where a load on the rotor blade pitch bearing is above threshold, enabling pitching the rotor blade in another range of azimuthal positions of the rotor, in particular where a load on the rotor blade pitch bearing is at or below the threshold.

When the pitching is disabled in a range of azimuthal positions, the pitch travel is zero in this region, thereby also pitch bearing damage may be very low or even zero in this range. When pitching the rotor blade is enabled in another range of azimuthal position where a load is relatively low and in particular below the threshold, the pitch bearing damage can be ensured to be in an acceptable range. Pitching the rotor blade may in particular be disabled in a range of azimuthal position in which the rotor blade points upwards (or is performing downswing) or is in a range between +/−60° or +/−40° deviating from an orientation between 30° and 50° in the direction of downswing. Other ranges are possible. In this range, the bending moment of the rotor blade or the bearing bending moment may be expected to be highest, since in this range, the rotor blade is arranged at highest altitude where the highest wind speed is expected and/or where the highest gravitation or lever arm acts on the blade and/or pitch bearing.

The most damage to the pitch bearing may occur on the downswing. This is when gravity, torque forces and thrust forces may cause the most damage to the weakest spot on the bearing. At average shear it may be about 80° to 100° azimuth angle. Pitching may be limited to be performed past downswing to before vertical position.

According to an embodiment of the present invention, pitching the rotor blade comprises pitching the rotor blade with a pitch rotational speed that depends on the azimuthal position of the rotor, wherein in particular the pitch rotational speed is adjusted to be lower for an azimuthal position in which the longitudinal axis of the rotor blade is vertically oriented, while a tip of the rotor blade is pointing upwards, than for other azimuthal positions.

The pitch rotational speed may be the rotational speed with which the rotor blade is rotated around its longitudinal axis. When the pitch rotational speed is low, the pitch travel (in a particular time interval) is low, when the pitch rotational speed is high, the pitch travel (in this particular time interval) is high. Thus, for example by reducing the pitch rotational speed in a particular range of azimuthal positions, results in decreasing the pitch travel in this region. In particular, the pitch rotational speed may be lower in an azimuthal angle range in which the rotor blade is between +/−60° or +/−40° deviating from an orientation between 30° and 50° in the direction of downswing, than in other azimuthal positions or in another azimuthal angle range. In particular, the pitch rotational speed may be inversely proportional an exponent of the (measured or estimated) bearing moment according to particular embodiments.

According to an embodiment of the present invention, the pitch rotational speed depends on the azimuthal position according to a predefined curve and/or the pitch rotational speed is inversely proportional to a load on the blade pitch bearing or rotor blade.

The predefined curve may have been established by performing simulations or calculations for example in order to keep the pitch bearing damage or pitch bearing load across a whole revolution of the rotor blade below a threshold. The predefined curve may be different from a constant. The predefined curve may comprise at least one minimum and at least one maximum that are different from each other.

The disabling the pitching in a particular range, the enabling the pitching in another range of azimuthal position and the pitching the rotor blade with a pitch rotational speed that depends on the azimuthal position on the rotor may be combined.

According to an embodiment of the present invention, the pitch rotational speed is different for the cases where the target pitch angle is adjusted from an initial pitch angle to the target pitch angle in a direction towards and away from stall. Simulation or physical modelling may enable to define whether the rotational speed is higher or lower when the initial pitch angle is adjusted in a direction towards or away from stall. Defining the pitch rotational speed may depend on other factors, such as wind speed, wind turbulence, rotational speed of the rotor and the like.

According to an embodiment of the present invention, the pitching the rotor blade comprises pitching the rotor blade depending on a measured blade root moment and/or pitch bearing load or expected pitch bearing damage indicating quantity.

The pitch bearing load may be estimated from operational parameters of the wind turbine or the environment, such as wind speed, geometry and material of the rotor blade and/or actual pitch angle and so on or may be measured using one or more sensors, such as strain sensors. The measured blade root moment and/or the pitch bearing load may turn out to also depend on the azimuthal position of the rotor. Thereby, an effective reduction of the bearing load may be achieved.

According to an embodiment of the present invention, the pitching the rotor blade comprises pitching the rotor blade further depending on pitch bearing load accumulated over time. When the pitch bearing load accumulated over time is relatively low, the pitch bearing may sustain and withstand relatively high future loads. When the pitch bearing load accumulated over time is relatively high, future bearing loads may be reduced by for example disabling the pitching in a particular azimuthal position range or at least reducing the pitch rotational speed in this range or these ranges.

According to an embodiment of the present invention, the azimuthal position is defined in degrees relative to the vertically oriented longitudinal axis of the rotor blade, while the tip of the rotor blade is pointing upwards, wherein the pitch rotational speed has a first average value in an azimuthal position range between 80° and 350°, in particular between 110° and 330°, wherein the pitch rotational speed has a second average value in an azimuthal position range between 300° and 140°, in particular between 330° and 110°, wherein the first average value is between two times and 100 times as great as the second average value. No pitching may be performed between 0° and 90°.

The azimuthal position may be individually defined for every rotor blade of plural rotor blades connected to the rotor. The curve according to which the pitch rotational speed may be set may be symmetric or not symmetric with respect to the position at 0° or at 180°. Simulations and physical modelling or excremental data may be performed to define the curve defining the pitch rotational speed in dependence of the azimuthal position of the rotor blade, such as e.g. arrive at a desired course of bearing load across a whole revolution of the rotor blade.

According to an embodiment of the present invention, the pitch rotational speed depends on the azimuthal position, if pitch bearing load indicating quantity indicates that the load of the pitch bearing, on average or when vertically oriented, exceeds a threshold. If it turns out that the pitch bearing load is, even when the rotor blade is vertically oriented and pointing upwards, relatively low, such as below a threshold, it may not be necessary to disable pitching the rotor blade or it may not be necessary to reduce the pitch rotational speed in a particular azimuthal position range. Thereby, the rotor blade may be faster pitched towards the target blade pitch angle.

According to an embodiment of the present invention, the pitch bearing load indicating quantity is estimated and/or measured and/or calculated from at least one operational parameter of the wind turbine or the environment. The pitch bearing load may for example be estimated or calculated from wind speed, rotor blade geometry and material, actual blade pitch angle and/or characteristics of the pitch bearing, such as geometry, material, design and so on. Thereby, the pitching of the rotor blade may also be performed directly depending on the pitch bearing load (as estimated or calculated or measured).

The pitch rotational speed may depend on the average load of each blade's pitch bearing, wherein in particular the rate of pitch change is a function of each blade's bearing load compared to the average bearing load on all blades. The pitch bearing loads $M_{PitBearFluctA}$, $M_{PitBearFluctB}$, $M_{PitBearFluctC}$ of blades A, B and C, respectively (depending on which the pitching may be performed) may e.g. be determined based on the following equations (1) to (4), wherein $M_{PitBearMean}$ is the average load over all blades.

$$M_{PitBearMean} = (M_{PitBearA} + M_{PitBearB} + M_{PitBearC})/3 \text{ [kNm]} \tag{1}$$

$$M_{PitBearFluctA} = M_{PitBearA} - M_{PitBearMean} \text{ [kNm]} \tag{2}$$

$$M_{PitBearFluctB} = M_{PitBearB} - M_{PitBearMean} \text{ [kNm]} \tag{3}$$

$$M_{PitBearFluctC} = M_{PitBearC} - M_{PitBearMean} \text{ [kNm]} \tag{4}$$

Thus the individual pitch bearing loads (as used in embodiments of the present invention) of the blades may be calculated as a difference between the average pitch bearing load and the measured or estimated pitch bearing load $M_{PitBearA}$, $M_{PitBearB}$, $M_{PitBearB}$ of the individual blade.

According to an embodiment of the present invention, pitch rotational speed depends on the load on the pitch bearing and/or the azimuthal position, if: the load level of pitch bearing exceed a threshold, and/or a wind turbulence level is greater than a threshold, and/or a deviation of a drive train rotational speed from a reference exceeds threshold and/or a wind speed is greater than a threshold.

In those situations or under those conditions, the pitch bearing load may be at risk to be above a threshold in one or more azimuthal angle ranges. In these azimuthal angle ranges, the pitch rotational speed may then be reduced to satisfy one criterion, such as that the pitch bearing damage or pitch bearing load is below a threshold.

The pitching the rotor blade may comprise rotating the rotor blade around a longitudinal axis of the rotor blade.

According to an embodiment of the present invention, it is provided a method for adjusting pitch angles of a first rotor blade and a second rotor blade both connected to a rotor of a wind turbine, the method comprising pitching the first rotor blade towards a target blade pitch angle in a different manner than pitching the second rotor blade towards the target blade pitch angle.

Pitching each of the first rotor blade and the second rotor blade may be performed independently from each other according to one of the embodiments of a method for adjusting a pitch angle of a rotor blade as described above.

It should be understood that features, individually or in any combination disclosed, described, or provided for a method for adjusting a pitch angle of a rotor blade may also be applied, individually or in any combination, to a method for adjusting pitch angles of a first rotor blade and a second rotor blade both connected to a rotor of a wind turbine and may also applied to an arrangement for adjusting a pitch angle of a rotor blade connected to a rotor of a wind turbine according to an embodiment of the present invention and vice versa.

According to an embodiment of the present invention, it is provided an arrangement for adjusting a pitch angle of a rotor blade connected to a rotor of a wind turbine, the arrangement comprising: a pitching system adapted to pitch the rotor blade towards a target blade pitch angle, the manner to pitch depending on an azimuthal position of the rotor.

The pitch system may comprise an actuator enabled to rotate the rotor blade around its longitudinal axis. The pitch system may receive (the target pitch angle and) the azimuthal position of the rotor or the azimuthal position of the rotor blade connected to the rotor and may pitch the rotor blade depending on the azimuthal position of the rotor or the azimuthal position of the rotor blade or the orientation of the rotor blade towards the target pitch angle.

Further, a wind turbine is provided which comprises a rotor, at least one rotor blade connected to the rotor and an arrangement for adjusting a pitch angle of a rotor blade according to an embodiment as described above.

BRIEF DESCRIPTION

Some of the embodiments will be described in detail, with reference to the following figures, wherein like designations denote like members, where in.

DETAILED DESCRIPTION

The illustration in the drawings is in schematic form.

Figure 1:
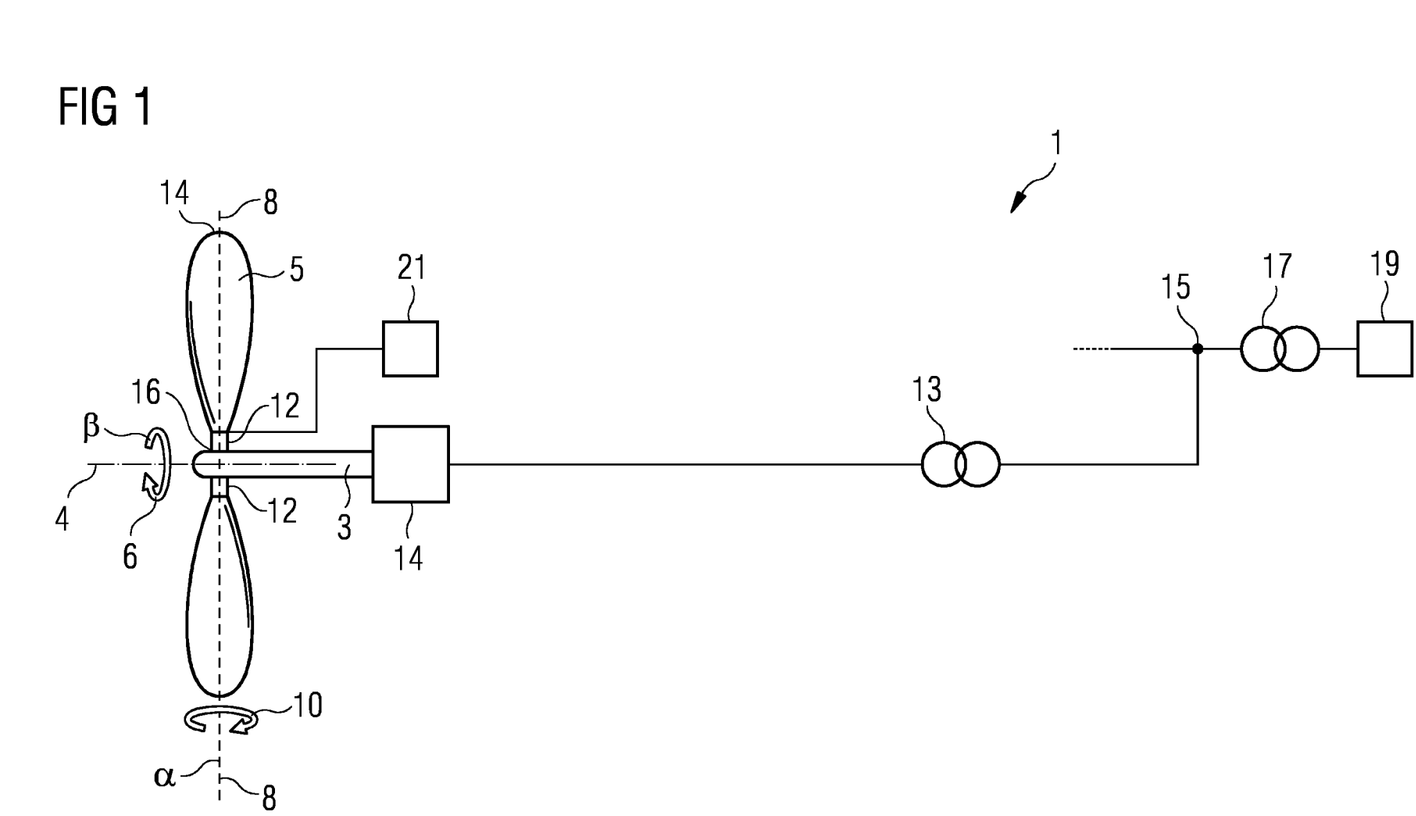
FIG. 1 schematically illustrates a wind turbine according to an embodiment of the present invention.

The wind turbine 1 illustrated in FIG. 1 comprises a rotor 3 at which plural rotor blades 5 are connected. The rotor 3 drives a generator 14 which generates, upon rotation of the rotor 3, electric power (for example 3-phase power) which may be supplied to an (optional) AC-DC converter from there to a (optional) DC link and from there to (optional) a DC-AC converter which converts the energy stream to a fixed frequency power stream which is supplied to a transformer 13 which transforms the power stream to a higher voltage and which is connected to a point of common coupling 15 to which further wind turbines are connected. The point of common coupling is optionally via a wind park transformer 17 connected to a utility grid 19.

The wind turbine 1 further comprises an arrangement 21 for adjusting a pitch angle α of the rotor blade 5 according to an embodiment of the present invention. The arrangement 21 comprises a pitching system adapted to pitch the rotor blade towards a target blade pitch angle dependent on an azimuthal position β of the rotor 3. Therein, the azimuthal position β of the rotor 3 is defined with respect to a rotation around the rotor rotation axis 4 as indicated by the arrow 6. Thus, the pitching system 21 pitches the rotor blade, i.e. rotates the rotor blade 5 around its longitudinal axis 8 along the pitching direction as indicated by the arrow 10 which pitching depends on the orientation or azimuthal position β of the rotation of the rotor 3 around the axis 4.

The inventors noted that the combination of pitch activity and very high bending loads may lead to pitch bearing damage and in particular may lead to a so-called low cycle fatigue. Embodiments of the present invention reduce a load on the pitch bearing 12 which supports the rotor blade 5 rotationally enabling pitching the rotor blade 5 around the longitudinal axis 8 of the rotor blade 5. Embodiments of the present invention utilize the fact that the damage of the pitch bearing 12 is not accumulated uniformly along the azimuth (i.e. along one revolution of the rotor 3), but that more damage accumulates when the blades 5 are pointing upwards and/or in a range of azimuthal position where the blade is at downswing. The rotor blades 5 have a root 16 at which the rotor blades 5 are connected or mounted at the rotor 3, in particular mounted at a hub of the rotor 3. The bearing may be located close to the root 14.

Figure 2:
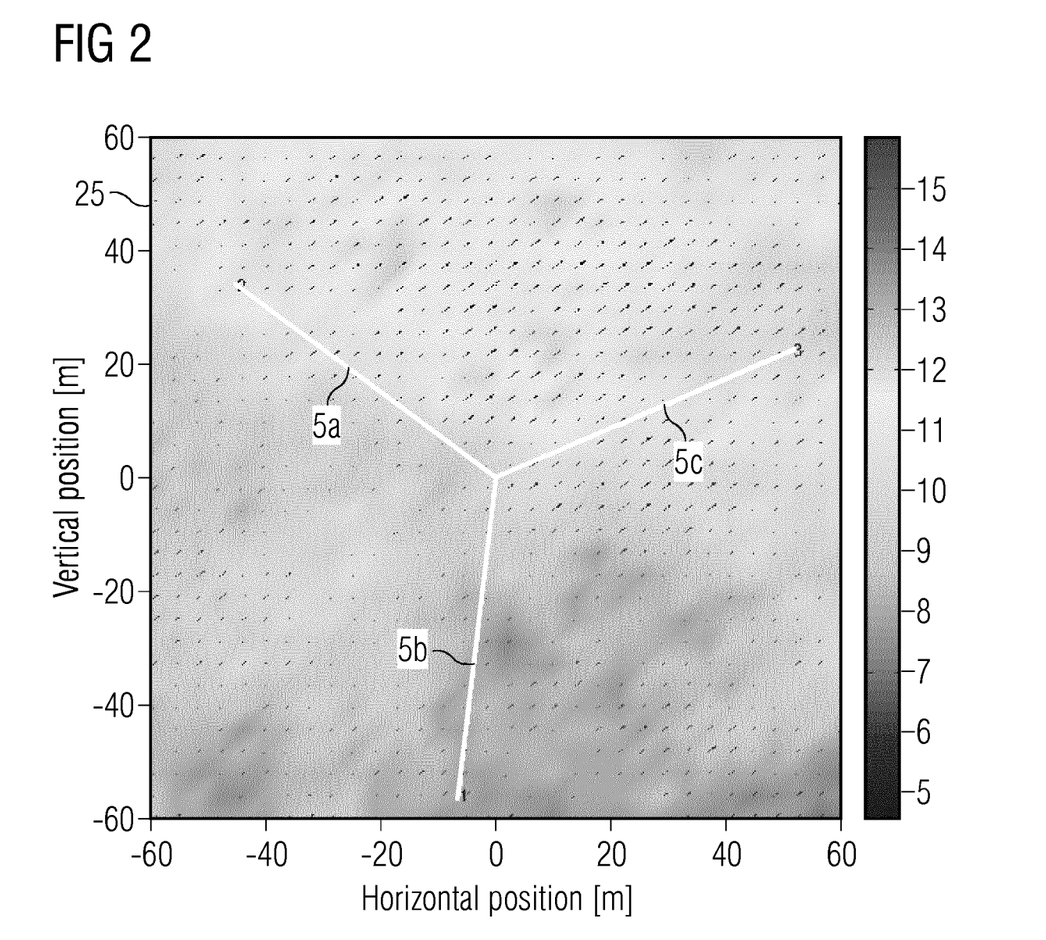
FIG. 2 illustrates a graph showing a wind speed experienced by several rotor blades.
Figure 3:
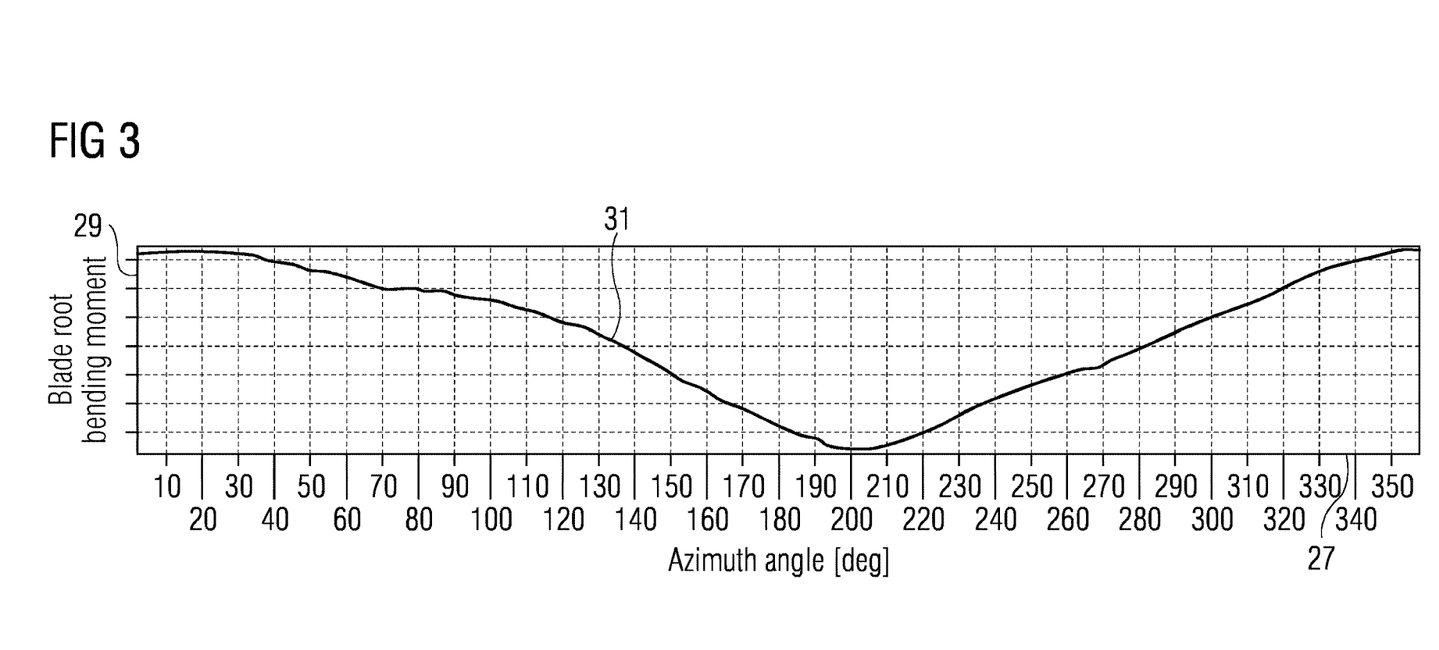
FIG. 3 illustrates a graph of the blade root bending moment in dependence of the azimuth angle.

A simple explanation for this observation is the distribution of blade loads as a function of the azimuth. Normally, the wind speed in the top of the rotor is expected and is in fact higher than in the lower part. FIG. 2 illustrates an example of wind speed measurements, wherein the axis 23 denotes a horizontal position and the axis 25 denotes a vertical position, while the measured wind speed is depicted as a heat map. Shown are three rotor blades 5a, 5b, 5c which are at different orientations and in which two (5a, 5c) of them experience higher wind speed and thus higher loads than the third rotor blade 5b. The heat map shows the trend of higher wind speeds towards the top. This in turn causes a higher loading at the blade-hub interface as shown in the next FIG. 3, in which the abscissa 27 indicates the azimuth angle (i.e. an angle β along the arrow 6 defining an azimuthal position of the rotor 3) and wherein the ordinate 29 denotes the blade root bending moment. The curve 31 of the blade root bending moment indicates that the loading is highest when the azimuth is around 0° (or 360°) which corresponds to the position of the blade pointing upwards.

Figure 4:
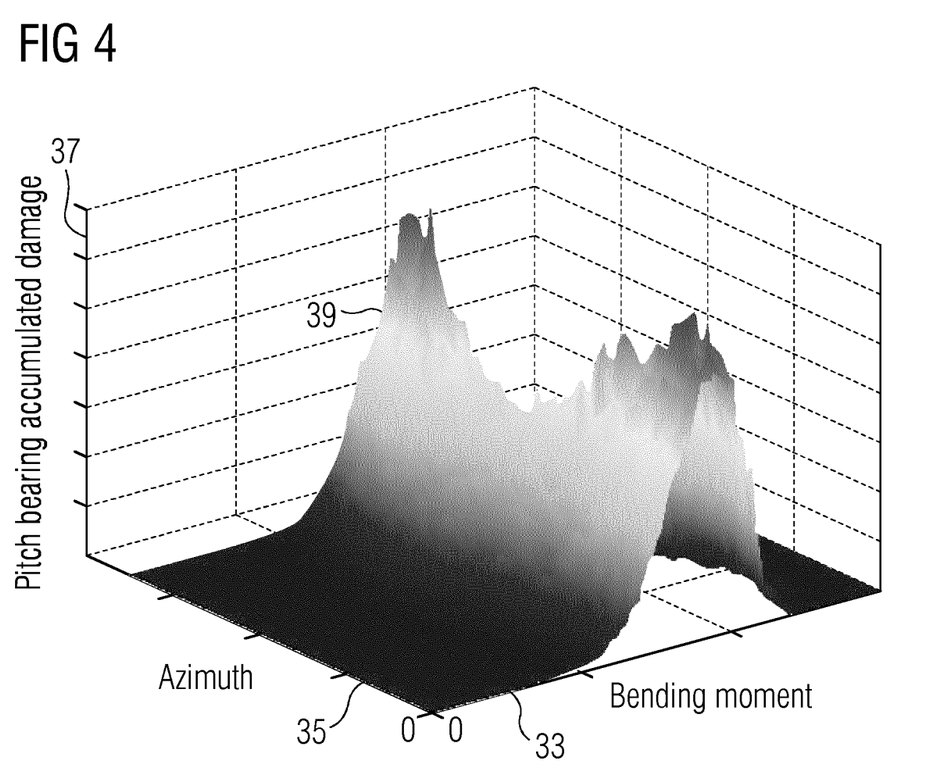
FIG. 4 illustrates a plot of the pitch bearing accumulated damage in dependence of the azimuth angle and the bending moment.

When combining the full range of operation covering wind speeds from cut-in to cut-out, considering the different levels of loading and computing the accumulated damage, a surface plot as illustrated in FIG. 4 is obtained. Therein, the axis 33 denotes the bending moment, the axis 35 denotes the azimuthal position and the vertical axis 37 denotes the pitch bearing accumulated damage. The surface plot 39 shows the damage distributed into bending moment bins and azimuth bins. Damage is accumulated in the form of duration loads, where damage occurs only when the pitch system is active.

Figure 5:
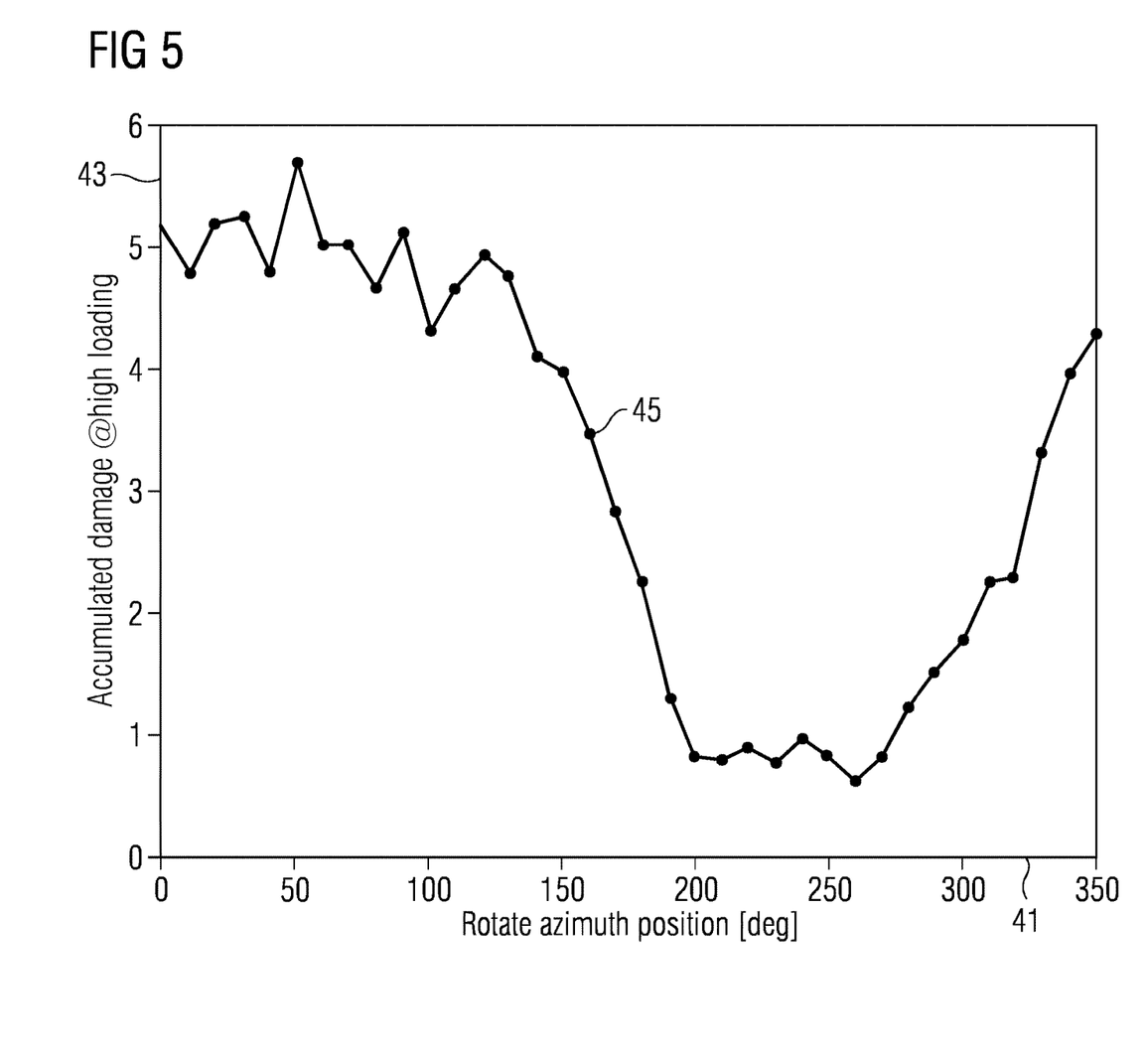
FIG. 5 illustrates a graph showing the accumulated damage at high loading in dependence of the rotor azimuthal position.

If a cut is made at high loading levels along the surface of FIG. 4, then an accumulated damage distribution as the one shown in FIG. 5 is obtained, wherein the abscissa 41 indicates the rotor azimuthal position, while the ordinate 43 denotes the accumulated damage at high loading. The curve 45 illustrating the accumulated damage at high loading shows that the most of the damage is accumulated when the blades are in between the upper part (vertically high) of the rotation plane and continuing until past the downswing. The damage is shown most from 0° to 130°.

According to one embodiment of the present invention, the accumulated pitch damage is reduced by reducing the pitch activity when the blades are in the upper section of the rotor plane. Reducing the pitch activity may be performed in a number of ways, as is explained below.

Figure 6:
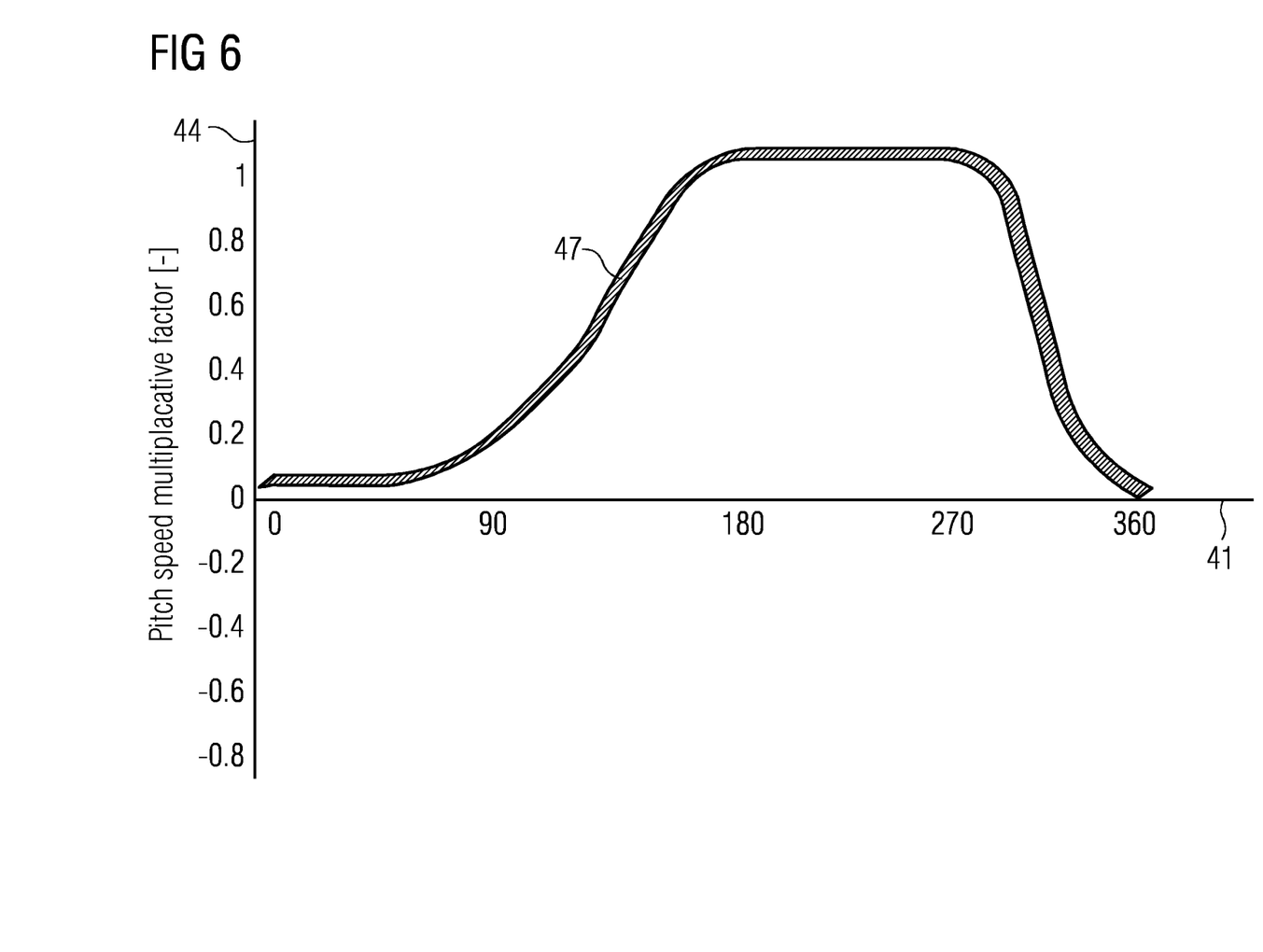
FIG. 6 illustrates an example of a pitch speed scaling factor in dependence of the azimuthal position.

In one embodiment of the present invention, the pitch speed of every blade is scaled independently according to the local azimuth position according to a prescribed function similar to that what is shown in FIG. 6, wherein the abscissa 41 denotes the azimuthal position, while the ordinate 44 denotes the pitch speed multiplicative factor, i.e. a scaling factor according to which the pitch rotational speed is adapted. The form of the prescribed function 47 showing the pitch speed multiplicative factor may be different for pitch movement towards and away from stall, thus when the upper edge of the blade is turned away from the tower so that the blade is in the wind or such that the upper edge of the rotor blade faces the wind.

According to another embodiment, the loads on the pitch bearing may either be estimated from convenient signals or measured by a sensor, such as a strain gauge sensor or optical fibre sensor, positioned at the root 14 of the blade 5 (see FIG. 1). The sensor may also be mounted at an outboard section of the blade. When the level of loading exceeds a given threshold, the scaling of the pitch speed may begin. Thus, the definition of the pitch speed may be according to the curve 47 illustrated in FIG. 6 depending on the actual bending moment or bearing load.

Figure 7:
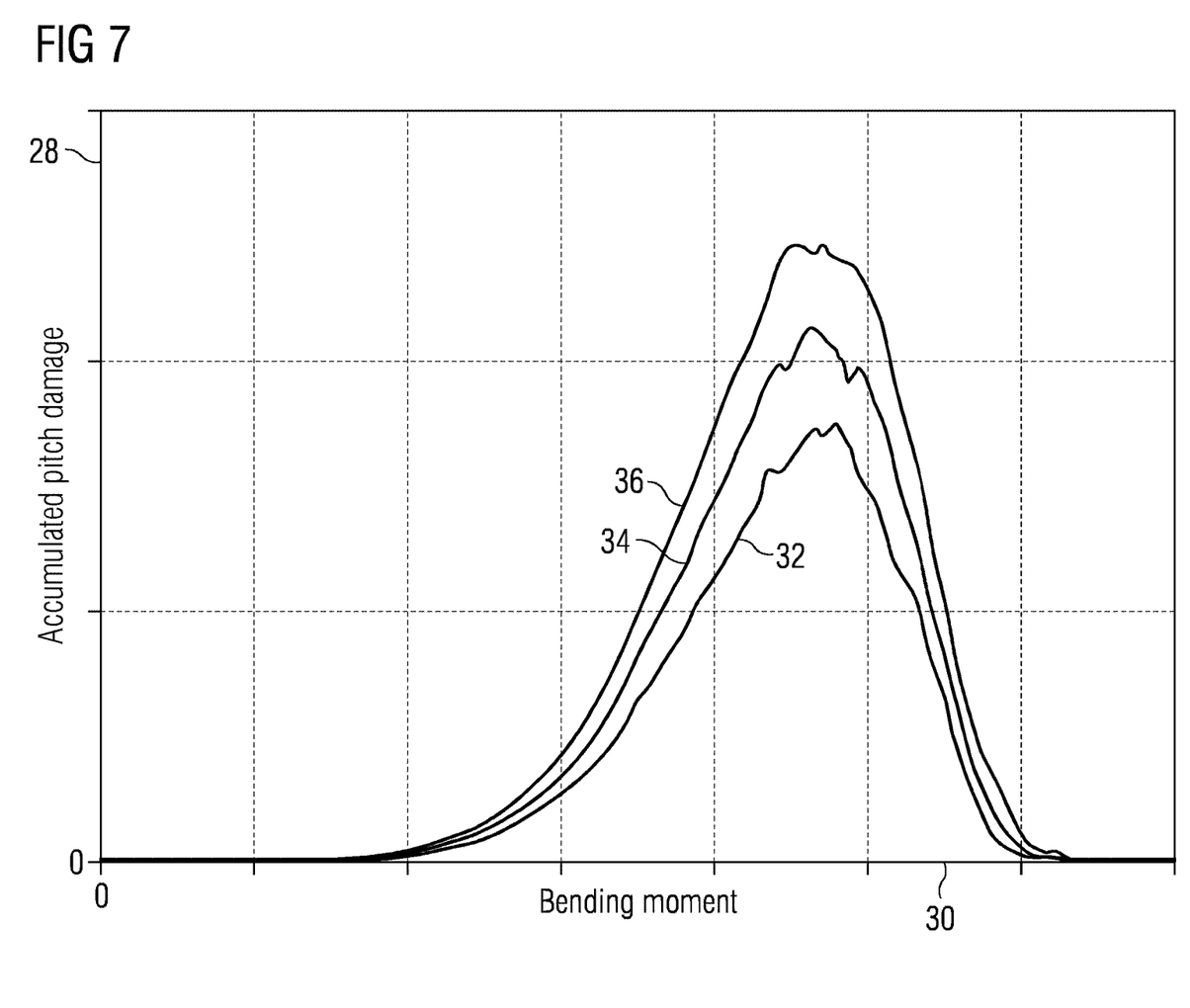
FIG. 7 illustrates a graph showing the accumulated pitch damage in dependence of the bending moment for different wind turbulences.

FIG. 7 illustrates curves 32, 34, 36 of accumulated pitch damage at wind turbulence intensities 0.08, 0.1, 0.12 respectively in dependence of the bending moment denoted on the abscissa 30, while the ordinate 28 denotes the accumulated pitch damage. As can be observed from the curves 32, 34, 36 in FIG. 7, the accumulated pitch damage increases with increasing wind turbulence intensities. Embodiments of the present invention aid to reduce pitch bearing damage.

In still another embodiment of the present invention, a characteristics of the temporal and/or spatial distribution of the incoming turbulent flow may be estimated using convenient signals and the pitch velocity may be adapted accordingly (i.e. less pitch actuation in the upper part of the rotor at high turbulence intensity levels than at low level, more pitch actuation or higher pitch speed in whichever area of the rotor the axial wind speed is lower or lowest).

In still another embodiment of the present invention, the pitch speed scaling factor may be adjusted in response to a signal derived from the difference between drive-train rotational speed and a reference, such that all blade pitch, irrespective of azimuth, in cases where the drive-train speed deviates greatly from the reference speed.

In still another embodiment of the present invention, the pitch speed scaling factor may be adjusted in response to a wind speed measurement or estimate, set of wind speed measurements or wind shear measurement or estimate upstream from the wind turbine.

Different features of different embodiments may be combined with those of still other embodiments of the present invention described below.

The pitch velocity may be dependent on the azimuthal position of the rotor or rotor blade and may potentially also depend on the turbulence intensity level of the wind.

According to embodiments of the present invention, the fact is used that the damage of the pitch bearing is not accumulated uniformly at all azimuth angles (i.e. along one rotation of the rotor).

Embodiments of the present invention also propose to pitch different blades independently from each other to reduce pitch bearing damage. When a particular blade is under significant more load than the other blades, such as two blades, the higher loaded blade may not be pitched. Since loads on the blades are generally cyclical around the azimuth, this usually means that the blade may not be pitched during around 33% of each rotation or revolution (or for about 1 to 2 s each revolution). The blade pitch angle of the not pitched (whose pitch angle had been held to reduce pitch bearing load) blade may then catch up to the other blades once the load is lower.

Embodiments of the present invention may be implemented as controllers which serve to reduce pitch bearing load.

Figure 8:
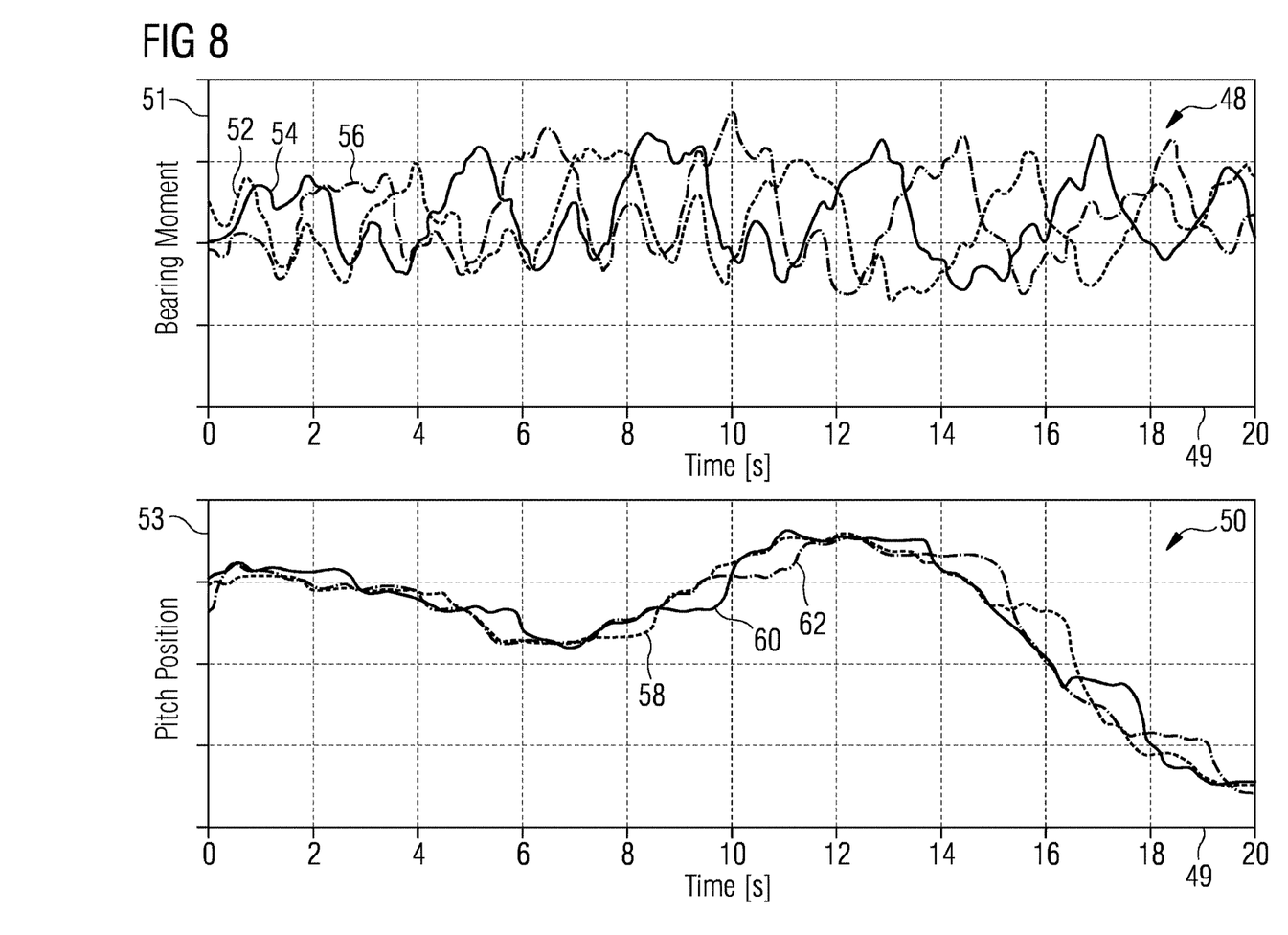
FIG. 8 illustrates graphs of the bearing moment and the pitch position in dependence of time.

According to one embodiment of the present invention, the pitch rate (i.e. the pitch speed) is reduced for the more heavily loaded blades relative to the other blades, as is illustrated in FIG. 8. In FIG. 8, the abscissas 49 of the graphs 48 and 50 denote the time, while the ordinate 51 denotes the bearing moment and the ordinate 53 denotes the pitch position. In graph 48 of FIG. 8 the curve 52 indicates the bearing moment of a first blade, the curve 54 denotes the bearing moment of a second blade, and the curve 56 denotes the bearing moment of a third blade. As it can be observed, the bearing moments vary with time, as the blades rotate around the rotor axis. Thus, the bearing moments depend on the azimuthal position. The pitch rate or pitch speed of pitching those rotor blades which are at azimuthal positions showing high bearing moment may be reduced relative to rotor blades being subjected to lower bearing moments, i.e. being at other azimuthal positions.

According to another embodiment of the present invention, individual pitch rates or pitch speeds of the blades may be set inversely proportional to the load on each blade, wherein the load is for example been taken from measured bearing moments as illustrated in graph 48 of FIG. 8.

When the bearing moment is relatively high, the pitch rate or pitch speed on the respective rotor blade may be limited or may be reduced relative to other rotor blades. Graph 50 of FIG. 8 illustrates curves 58, 60, 62 of the pitch position of the first, the second and the third rotor blades, respectively, in dependence of time. It is most clear from the time interval between 14 and 20 s of the simulation, that when the bearing moment is high, the pitch rate on that blade is limited. The slope of the line in graph 50 is the pitch rate. When there is no slope (slope is zero), the blades are not being pitched. They are not being pitched when the loading in graph 48 is high.

According to still another embodiment of the present invention, the pitch motion may be disabled as a function of the azimuth angle. For example, a rotor blade which is under high shear, may be disabled from pitching when for example pointing upwards.

According to still another embodiment of the present invention, a wind sensing may be used to change the pitch rates or pitch speeds as a function of the azimuth angle. Furthermore, according to still another embodiment of the present invention, pitch damage is accumulated over lifetime and adjusted accordingly using one of the above-mentioned methods.

According to an embodiment of the present invention, wind turbine blades are controlled independently to reduce pitch bearing damage. Embodiments of the present invention target one blade at a time and may be able to reduce the pitch bearing damage with less power loss or load gain. An advantage of embodiments of the present invention is that the bearing damage can be significantly lowered without a reduction in energy production.

Embodiments of the present invention may utilize blade root moment sensors which may provide a control signal to individually pitch the blades to reduce pitch bearing damage.

Advantages of the present invention may provide increased energy production from turbines that are conventionally heavily peak shaved, in order to reduce pitch bearing damage. It may also reduce warranty costs due to pitch bearing failures. Also pitch bearing costs may be reduced when embodiments of the present invention are applied.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for adjusting a pitch angle of a rotor blade connected to a rotor of a wind turbine, the method comprising:
    pitching the rotor blade towards a target blade pitch angle with a pitch rotational speed that depends on a load on a pitch bearing,
    wherein the pitch rotational speed is adjusted to be lower in a range of azimuthal positions in which the load on the pitch bearing due to aerodynamics and due to gravitation is larger than for other azimuthal positions.

2. The method according to claim 1, wherein the pitching the rotor blade comprises:
    decreasing a pitch rate of the rotor blade in a range of azimuthal positions of the rotor, where the load on the rotor blade pitch bearing or a bending moment of the rotor blade is above a threshold; and
    increasing the pitch rate of the rotor blade in another range of azimuthal positions of the rotor, where the load on the rotor blade pitch bearing or the bending moment of the rotor blade is at or below the threshold.

3. The method according to claim 1, wherein
    the pitch rotational speed further depends on the azimuthal position of the rotor.

4. The method according to claim 3, wherein the pitch rotational speed depends on the azimuthal position according to a predefined curve (and/or
    wherein the pitch rotational speed is the smaller the greater the load on the pitch bearing is.

5. The method according to claim 3, wherein the pitch rotational speed depends on the azimuthal position, if the pitch bearing load indicating quantity indicates that the load of the pitch bearing exceeds a threshold,
    wherein the pitch bearing load indicating quantity is estimated and/or measured and/or calculated from at least one operational parameter of the wind turbine or the environment.

6. The method according to claim 5, wherein the pitch rotational speed is lower for azimuthal positions where the rotor blade performs a downswing than for azimuthal positions where the rotor blade performs an upswing.

7. The method according to claim 1, wherein the pitch rotational speed:
    has a first value, when the target pitch angle is adjusted from an initial pitch angle to the target pitch angle in a direction towards stall, and
    has a second value, when the target pitch angle is adjusted from the initial pitch angle to the target pitch angle in a direction away from stall,
    wherein the first value is different from the second value.

8. The method according to claim 1, wherein the pitching of the rotor blade comprises:
    pitching the rotor blade depending on a measured blade root moment and/or pitch bearing load indicating quantity.

9. The method according to claim 1, wherein the pitching the rotor blade comprises:
    pitching the rotor blade further depending on pitch bearing load accumulated over time.

10. The method according to claim 1, wherein
    the azimuthal position is defined in degrees relative to a vertically oriented longitudinal axis of the rotor blade, while a tip of the rotor blade is pointing upwards,
    wherein the pitch rotational speed has a first average value in an azimuthal position range between 110 and 350°,
    wherein the pitch rotational speed has a second average value in an azimuthal position range between 350 and 110°
    wherein the first average value is between two times and 100 times as great as the second average value.

11. The method according to claim 1, wherein pitch rotational speed depends on the load on the pitch bearing, if:
    the load level of the pitch bearing exceeds a threshold, and/or
    a wind turbulence level is greater than threshold, and/or
    a deviation of drive train rotational speed from a reference exceeds a threshold and/or
    a wind speed is greater than a threshold.

12. The method according to claim 1, wherein the pitch rotational speed depends on the average load of each blade's pitch bearing,
    wherein a rate of pitch change is a function of each blade's bearing load compared to the average bearing load on all blades; and/or
    wherein the pitch rotational speed depends on a torsional strain on the rotor blade and/or on the pitch bearing.

13. A method for adjusting pitch angles of a first rotor blade and a second rotor blade both connected to a rotor of a wind turbine, the method comprising:
    pitching the first rotor blade with a first pitch rotational speed that depends on a first load on a first pitch bearing, wherein the first pitch rotational speed is adjusted to be lower in a range of azimuthal positions for the first rotor blade in which the load on the first pitch bearing due to aerodynamics and due to gravitation is larger than for other azimuthal positions of the first rotor blade, and
    pitching the second rotor blade with a second pitch rotational speed that depends on a second load on a second pitch bearing, wherein the second pitch rotational speed is adjusted to be lower in a range of azimuthal positions for the second rotor blade in which the load on the second pitch bearing due to aerodynamics and due to gravitation is larger than for other azimuthal positions of the second rotor blade,
    wherein pitching the first rotor blade is independent of pitching the second rotor blade.

14. An arrangement for adjusting a pitch angle of a rotor blade connected to a rotor of a wind turbine, the arrangement comprising:
    a pitching system configured to pitch the rotor blade towards a target blade pitch angle with a pitch rotational speed that depends on a load on a pitch bearing,
    wherein the pitch rotational speed is adjusted to be lower in a range of azimuthal positions in which the load on the pitch bearing due to aerodynamics and due to gravitation is larger than for other azimuthal positions.

15. A wind turbine, comprising:
a rotor;
at least one rotor blade connected to the rotor; and
the arrangement according to claim 14.

* * * * *